United States Patent
Lin et al.

(10) Patent No.: US 10,083,603 B2
(45) Date of Patent: Sep. 25, 2018

(54) ELECTRONIC APPARATUS AND METHOD FOR AUTOMATICALLY MATCHING REMOTE CONTROL SIGNAL

(71) Applicant: MediaTek Singapore Pte. Ltd., Singapore (SG)

(72) Inventors: Zhongxiao Lin, Sichuan (CN); Kunpeng Chen, Shenzhen (CN)

(73) Assignee: MediaTek Singapore Pte. Ltd., Singapore (SG)

( * ) Notice: Subject to any disclaimer, the term of this patent is extended or adjusted under 35 U.S.C. 154(b) by 0 days.

(21) Appl. No.: 15/297,167

(22) Filed: Oct. 19, 2016

(65) Prior Publication Data
US 2017/0116848 A1    Apr. 27, 2017

(30) Foreign Application Priority Data
Oct. 22, 2015    (CN) .......................... 2015 1 0690681

(51) Int. Cl.
*H04B 10/11*    (2013.01)
*G08C 23/04*    (2006.01)
*G06K 9/62*    (2006.01)

(52) U.S. Cl.
CPC ........... *G08C 23/04* (2013.01); *G06K 9/6267* (2013.01); *G08C 2201/20* (2013.01); *G08C 2201/50* (2013.01)

(58) Field of Classification Search
CPC .. H04B 10/1142; H04B 10/1149; H04B 10/12
See application file for complete search history.

(56) References Cited

U.S. PATENT DOCUMENTS

| 2011/0312278 A1* | 12/2011 | Matsushita | ....... H04L 12/40013 455/66.1 |
| 2012/0044428 A1* | 2/2012 | Cheng | .............. H04N 21/42219 348/734 |
| 2012/0210268 A1* | 8/2012 | Hilbrink | ............... G06F 3/0484 715/773 |
| 2015/0222862 A1* | 8/2015 | Lee | ........................ G08C 17/02 348/143 |
| 2017/0034563 A1* | 2/2017 | Fischer | ................ H04N 21/251 |

* cited by examiner

Primary Examiner — Dzung Tran
(74) Attorney, Agent, or Firm — Winston Hsu (57) ABSTRACT

Methods and electronic apparatus for automatically matching remote control signal are provided. The electronic apparatus comprises: an identifying circuit, for identifying an electrical appliance to generate an identifying signal; a signal emitting circuit, coupled to the identifying circuit, for obtaining at least one signal from a database according to the identifying signal, and transmitting the at least one signal to the electrical appliance, a feedback signal detecting circuit, coupled to the signal emitting circuit, for detecting whether the signal transmitted to the electrical appliance has any response, and generating a detecting result accordingly; and a determining circuit, coupled to the feedback signal detecting circuit, for determining at least one remote control signal according to the detecting result, wherein the at least one remote control signal is to control the electrical appliance. The present invention can make the operation become easier for users.

12 Claims, 7 Drawing Sheets

ELECTRONIC APPARATUS AND METHOD FOR AUTOMATICALLY MATCHING REMOTE CONTROL SIGNAL

BACKGROUND

The present invention relates to electronic apparatus, and more particularly, to electronic apparatus and methods capable of automatically matching remote control signal.

Household appliances increase day by day, and functions of the household appliances become more and more complex. Most household appliances (such as the TV, the air conditioner, the electrical fan, the blue-ray disk player, the audio equipment, the electrical light, or the air humidifier) has an infrared (IR) remote controller. With an increasing number of the IR remote controllers, it is very bothering for users to find the correct IR remote controller, and thus a mobile device with IR remote control function is developed. The user may match the household appliances with the mobile device via conventional software, to attain the purpose of using one device to control all the household appliances. However, it is hard for users to configure the remote control codes of the IR remote controller into the conventional software. The conventional software and device have the following problems and disadvantages: slow speed, requiring complex operations by the users, complex configuring process, and costing the users a lot of time.

SUMMARY

In accordance with exemplary embodiments of the present invention, electronic apparatus for automatically matching remote control signal and methods for automatically matching remote control signal are proposed to solve the above-mentioned problem.

According to a first aspect of the present invention, an exemplary electronic apparatus for automatically matching remote control signal is disclosed. The exemplary electronic apparatus comprises: an identifying circuit, a signal emitting circuit, a feedback signal detecting circuit, and a determining circuit. The identifying circuit is utilized for identifying an electrical appliance to generate an identifying signal. The signal emitting circuit is coupled to the identifying circuit, and utilized for obtaining at least one signal from a database according to the identifying signal, and transmitting the at least one signal to the electrical appliance. The feedback signal detecting circuit is coupled to the signal emitting circuit, and utilized for detecting whether the signal transmitted to the electrical appliance has any response, and generating a detecting result accordingly. The determining circuit is coupled to the feedback signal detecting circuit, and utilized for determining at least one remote control signal according to the detecting result, wherein the at least one remote control signal is to control the electrical appliance. In particular, the determining circuit is coupled to the identifying circuit, and the determining circuit determines a matching condition according to the identifying signal, and determines the at least one remote control signal according to the detecting result and the matching condition. In some embodiments, the feedback signal detecting circuit detects a first status of the electrical appliance before the signal emitting circuit transmits any signal to the electrical appliance, and detects a second status of the electrical appliance after the signal emitting circuit transmits any signal to the electrical appliance, and compares the first status and the second status of the electrical appliance to determine whether the signal transmitted to the electrical appliance has any response.

According to a second aspect of the present invention, an exemplary method for automatically matching remote control signal is disclosed. The exemplary method comprises: identifying an electrical appliance to generate an identifying signal; obtaining at least one signal from a database according to the identifying signal, and transmitting the at least one signal to the electrical appliance; detecting whether the signal transmitted to the electrical appliance has any response, and generating a detecting result accordingly; and determining at least one remote control signal according to the detecting result, wherein the at least one remote control signal is to control the electrical appliance. In particular, the method further comprising: adopting determining a matching condition according to the identifying signal, and determining the at least a at least one remote control signal capable of remote controlling the electrical appliance according to the detecting result and the matching condition. In some embodiments, the step of detecting whether the signal transmitted to the electrical appliance has any response, and generating the detecting result accordingly comprises: detecting a first status of the electrical appliance before the signal emitting circuit transmits any signal to the electrical appliance; detecting a second status of the electrical appliance after the signal emitting circuit transmits any signal to the electrical appliance; and comparing the first status and the second status of the electrical appliance to determine whether the signal transmitted to the electrical appliance has any response.

Briefly summarized, the electronic apparatus and the methods disclosed by the present invention can make the operation of the electrical appliance become easier for users.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
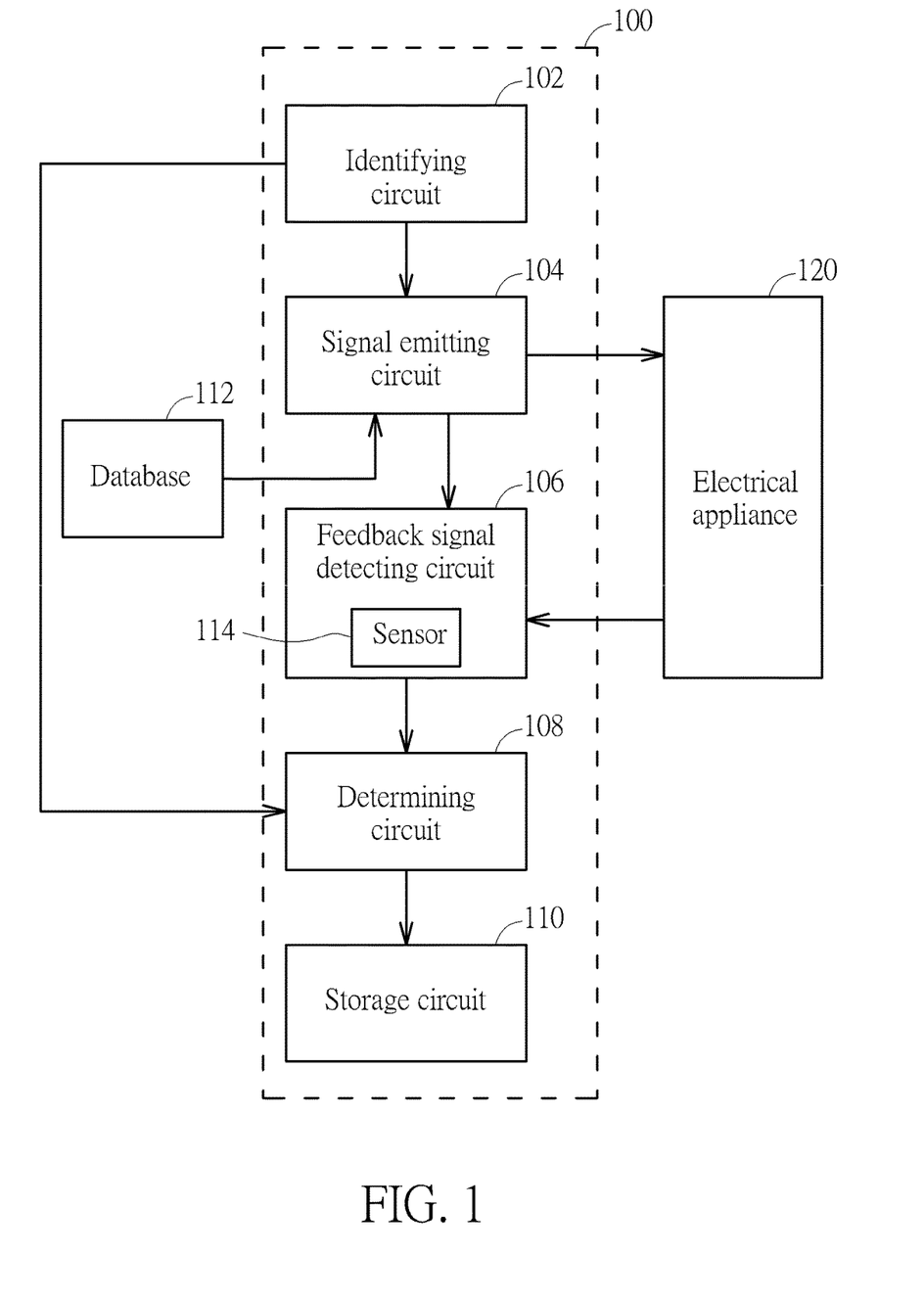
FIG. 1 is a simplified block diagram of an electronic apparatus capable of automatically matching remote control signal according to an embodiment of the present invention.
Figure 2:
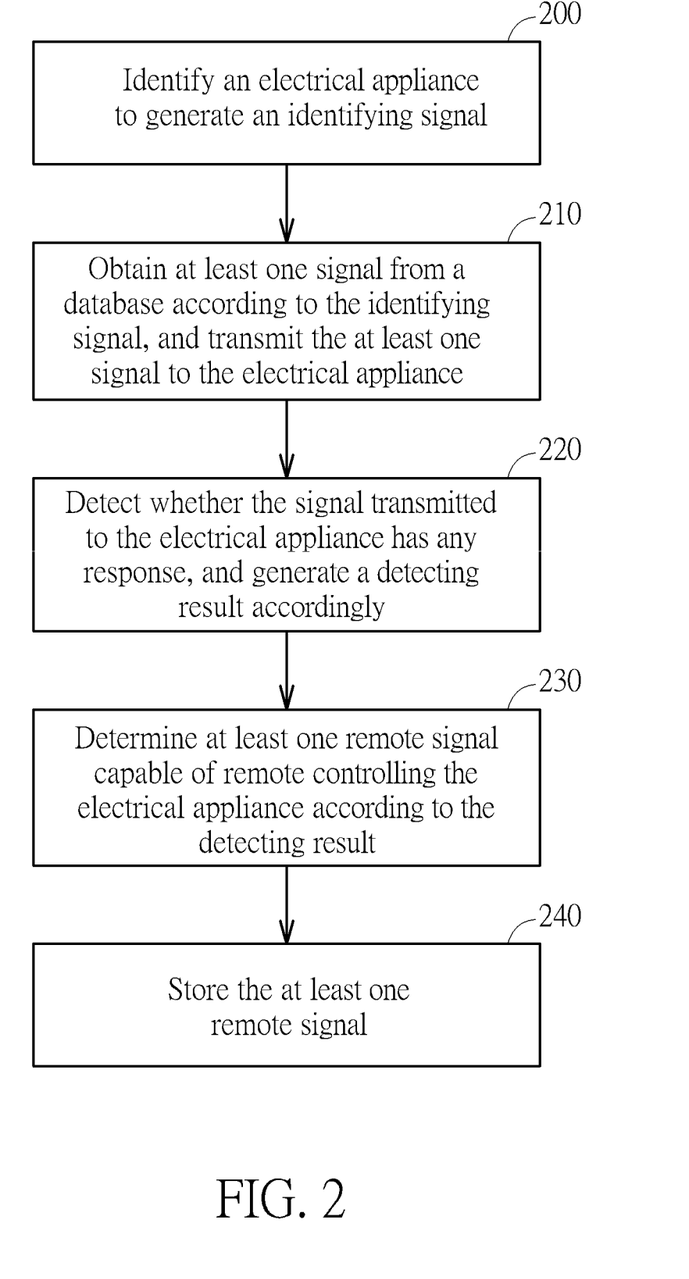
FIG. 2 is a flowchart showing a method for automatically matching remote control signal in accordance with an embodiment of the present invention.

Please refer to FIG. 1. FIG. 1 is a simplified block diagram of an electronic apparatus 100 capable of automatically matching remote control signal according to an embodiment of the present invention. The electronic apparatus 100 may be a mobile device such a smartphone or a tablet computer. As shown in FIG. 2, the electronic apparatus 100 comprises: an identifying circuit 102, a signal emitting circuit 104, a feedback signal detecting circuit 106, a determining circuit 108, and a storage 110.

The identifying circuit 102 is utilized for identifying an electrical appliance 120 to generate an identifying signal. In one embodiment, the identifying circuit may comprises a camera for identifying the electrical appliance. This is for illustrative purpose only, and is not meant to be a limitation of the present invention. Any other components that can identify the electrical appliance may be utilized in the identifying circuit 102.

The signal emitting circuit 104 is coupled to the identifying circuit 102, and utilized for obtaining at least one signal from a database 112 according to the identifying signal, and transmitting the at least one signal to the electrical appliance 120. In one embodiment, there may be a plurality of signals, then the signals may be transmitted in sequence. The signal emitting circuit 104 may comprise an infrared (IR) signal emitting circuit. This is for illustrative purpose only, and is not meant to be a limitation of the present invention. The signal emitting circuit 104 may comprise other types of emitting circuit, such as Bluetooth signal emitting circuit and WiFi signal emitting circuit, etc.

The database 112 may be a cloud database so that the electronic apparatus 100 may save spaces required by storing various kinds of remote control signals. According to an embodiment, the database 112 may be combined with the storage 110, and this is only for an illustrative purpose and is not meant to be a limitation of the present invention. The feedback signal detecting circuit 106 is coupled to the signal emitting circuit 104, and utilized for detecting whether the signal transmitted to the electrical appliance 120 has any response, and generating a detecting result accordingly. According to some embodiments, the feedback signal detecting circuit 106 may comprise at least one of the following components: a camera, a microphone, a light sensor, an acoustic sensor, an temperature sensor and a humidity sensor. This is for illustrative purpose only, and is not meant to be a limitation of the present invention.

The determining circuit 108 is coupled to the identifying circuit 102 and the feedback signal detecting circuit 106, and utilized for determining a matching condition according to the identifying signal, and further determining at least one remote control signal capable of remote controlling the electrical appliance 120 according to the detecting result and the matching condition. The storage 110 is utilized for storing the at least one remote control signal. The determining circuit 108 may comprise at least one processor (e.g. one or more processors) arranged for running at least one program module (e.g. one or more program modules), and the program module(s) running on the aforementioned at least one processor may control operations of the electronic apparatus 100. According to some embodiments, at least one portion (e.g. a portion or all) of the determining circuit 108 may be implemented with a customized semiconductor chip such as an application-specific integrated circuit (ASIC).

In addition, the step of the identifying circuit 102 identifying the electrical appliance 120 to generate the identifying signal may comprise: obtaining an image of the electrical appliance 120; performing an image identifying process on the image to identify a type of the electrical appliance 120; and generating the identifying signal according to the type of the electrical appliance 120. In another embodiment, the step of the identifying circuit 102 identifying the electrical appliance 120 to generate the identifying signal may comprise: obtaining an image of the electrical appliance 120; performing a character identifying process on the image to identify a type and a model of the electrical appliance 120; and generating the identifying signal according to the type and the model of the electrical appliance 120. For example, a camera of the electronic apparatus 100 may be utilized for obtaining an image of the electrical appliance 120, and the image may be processed by the image identifying process to identify the type of the electrical appliance 120 as a TV, an air conditioner, an electrical fan, a blue-ray disk player, an audio equipment, an electrical light, or an air humidifier, etc. Alternatively, the image also may be processed by the character identifying process to identify the type and the model of the electrical appliance 120. Please note that the camera is not necessarily to be disposed inside the electronic apparatus 100. In some embodiments, the camera may be coupled to the electronic apparatus 100, and this is only for an illustrative purpose and is not meant to be a limitation of the present invention.

The step of the signal emitting circuit 104 obtaining the at least one signal from the database 112 according to the identifying signal, and transmitting the at least one signal to the electrical appliance 120 may comprise: obtaining the at least one signal from the database 112 according to the identifying signal; dividing the at least one signal into at least one group of signals according to characteristics of the at least one signal; and transmitting the at least one group of signals to the electrical appliance 120. For example, the signal emitting circuit 104 is informed that the type of the electrical appliance 120 is a TV according to the identifying signal, and thus obtains 40 signals related to the TV from the database 112, and then separates the 40 signals into 4 groups of signals according to characteristics of the 40 signals. For example, 10 signals related to the power button is divided into a first group, and 10 signals related to the volume adjusting button is divided into a second group, and 10 signals related to the channel switching button is divided into a third group, and 10 signals related to the function table button is divided into a fourth group. Next, the signal emitting circuit 104 transmits the 4 groups of signals to the electrical appliance 120 according to a sequence. In addition, please note that the above embodiment is only for an illustrative purpose and is not meant to be a limitation of the present invention. For example, the number of the obtained signals and the group number may be changed according to different requirements.

The feedback signal detecting circuit 106 may comprise a sensor 114, and the step of the feedback signal detecting circuit 106 detecting whether the signal transmitted to the electrical appliance 120 has any response and generating the detecting result accordingly may comprise: detecting a first status of the sensor 114 (corresponding to a first status of the electrical appliance 120) before the signal emitting circuit 104 transmits any signal to the electrical appliance 120; detecting a second status of the sensor 114 (corresponding to a second status of the electrical appliance 120) after the signal emitting circuit 104 transmits any signal to the electrical appliance 120; and comparing the first status and the second status of the sensor 114 to determine whether the signal transmitted to the electrical appliance 120 has any response, and generating the detecting result accordingly. For example, the sensor 114 may comprise a light sensor, an acoustic sensor, a temperature sensor, and/or a humidity sensor. For example, when the first status and the second status of the sensor 114 are the same, it means that the electrical appliance 120 is not turned on or turned off by receiving the signal. In other words, the signal transmitted to the electrical appliance 120 does not have any response. When the first status and the second status of the sensor 114 are not the same, it means that the electrical appliance 120 is turned on or turned off by receiving the signal. In other words, the signal transmitted to the electrical appliance 120 has response. In addition, the present invention is not limited to detect the change of the electrical appliance 120 by detecting the change of the sensor 114, and the present invention may also utilize the camera or the microphone of the electronic apparatus 100 to perform an detection.

For example, the camera of the electronic apparatus 100 may capture a first image of the electrical appliance 120 (i.e. corresponding to a first status of the electrical appliance 120) before the signal emitting circuit 104 transmits a signal of the first group of signals (i.e. a signal related to the power button), and the feedback signal detecting circuit 106 may capture a second image of the electrical appliance 120 (i.e. corresponding to a second status of the electrical appliance 120) after the signal emitting circuit 104 transmits the signal of the first group of signals to the electrical appliance 120, and the feedback signal detecting circuit 106 may compare the first image and the second image of the electrical appliance 120 to determine whether the signal transmitted to the electrical appliance 120 has any response, and generate the detecting result accordingly. For example, when the first image and the second image of the electrical appliance 120 are the same, it means that the electrical appliance 120 is not turned on or turned off by receiving the signal. In other words, the signal transmitted to the electrical appliance 120 does not have any response. When the image and the second image of the electrical appliance 120 are not the same, it means that the electrical appliance 120 is turned on or turned off by receiving the signal. In other words, the signal transmitted to the electrical appliance 120 has response. In addition, please note that the above embodiment is only for an illustrative purpose and is not meant to be a limitation of the present invention. For example, the functions of the sensor may be changed according to different design requirements. The camera and/or the microphone may not be disposed inside the electronic apparatus 100, but may be coupled to the electronic apparatus 100.

The determining circuit 108 may determine the at least one remote control signal, which is capable of controlling the electrical appliance 120, at least according to the detecting result. When the detecting result shows that the signal transmitted to the electrical appliance 120 has a response, the determining circuit 108 determines the matched remote control signal. According to another embodiment of the present invention, the determining circuit 108 may further determine the at least one remote control signal according to a matching condition besides the detecting result. The matching condition may be determined by the determining circuit 108 according to the identifying result of the identifying circuit 102. For example, when the detecting result shows that the signal transmitted to the electrical appliance 120 does not have any response, the determining circuit 108 determines to switch to transmit a next signal to the electrical appliance 120, and when the detecting result shows that the signal transmitted to the electrical appliance 120 has a response, the determining circuit 108 determines whether the matching condition is satisfied. If the matching condition is not satisfied, then the determining circuit 108 determines to switch to transmit next group of signals to the electrical appliance 120; and if the matching condition is satisfied, then the determining circuit 108 determines the at least one remote control signal capable of remote controlling the electrical appliance 120.

For example, suppose that the matching condition is that each group of the first group of signals (i.e. the 10 signals related to the power button), the second group of signals (i.e. the 10 signals related to the volume adjusting button), the third group of signals (i.e. the 10 signals related to the channel switching button), and the fourth group of signals (i.e. the 10 signals related to the function table button) has one signal which can have response. When the detecting result shows that a signal of the first group of signals does not have any response, the determining circuit 108 determines to switch to transmit a next signal of the first group of signals to the electrical appliance 120. When the detecting result shows that the next signal of the first group of signals has a response, the determining circuit 108 determines whether the matching condition is satisfied. if the matching condition is not satisfied (for example, the four signals that can have response in four groups have not all picked out), then the determining circuit 108 determines to switch to transmit the second group of signals to the electrical appliance 120. Next, when the detecting result shows that a signal of the second group of signals does not have any response, the determining circuit 108 determines to switch to transmit a next signal of the second group of signals to the electrical appliance 120. When the detecting result shows that the next signal of the second group of signals which is transmitted to the electrical appliance 120 has a response, the determining circuit 108 determines whether the matching condition is satisfied. If the matching condition is not satisfied, then the determining circuit 108 determines to switch to transmit the third group of signals to the electrical appliance 120, and so forth. When the detecting result shows that a signal of the fourth group of signals has a response, and the determining circuit 108 determines the matching condition is satisfied, then the determining circuit 108 determines the 4 remote control signals capable of remote controlling the electrical appliance 120. Next, the storage 110 is utilized for storing the 4 remote control signals. Please note that the above embodiment is only for an illustrative purpose and is not meant to be a limitation of the present invention. For example, the matching condition may be changed according to different design requirements.

Please refer to FIG. 2. FIG. 2 is a flowchart showing a method for automatically matching remote control signal in accordance with an embodiment of the present invention. Provided that substantially the same result is achieved, the steps of the process flowchart do not have to be in the exact order shown in FIG. 9 and need not be contiguous, meaning that other steps can be intermediate or certain steps can be ignored (such as Step 240). The method of the embodiment of the present invention comprises the following steps:

Step 200: Identify an electrical appliance to generate an identifying signal.

Step 210: Obtain at least one signal from a database according to the identifying signal, and transmit the at least one signal to the electrical appliance.

Step 220: Detect whether the signal transmitted to the electrical appliance has any response, and generate a detecting result accordingly.

Step 230: Determine at least one remote signal capable of remote controlling the electrical appliance according to the detecting result.

Step 240: Store the at least one remote signal.

Figure 3:
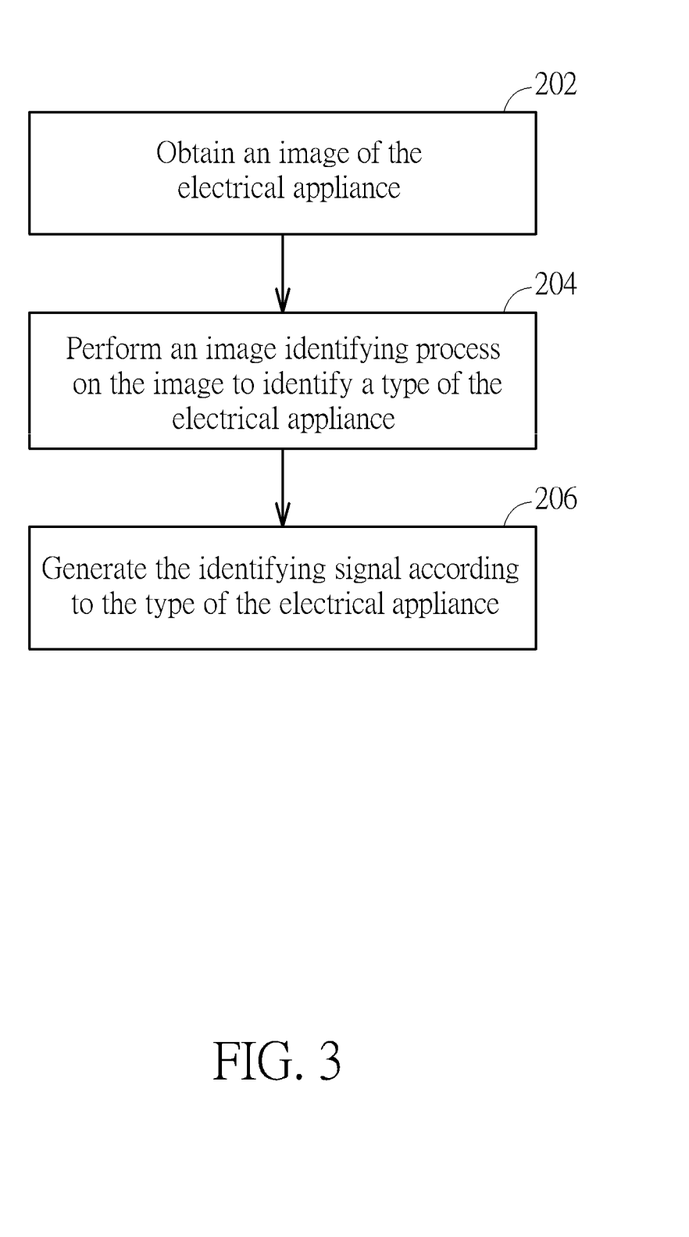
FIG. 3 is a flowchart in accordance with an embodiment of the Step 200 in FIG. 2.

Please refer to FIG. 3. FIG. 3 is a flowchart in accordance with an embodiment of the Step 200 in FIG. 2. The step 200 of identifying the electrical appliance to generate the identifying signal may comprise the following steps:

Step 202: Obtain an image of the electrical appliance.

Step 204: Perform an image identifying process on the image to identify a type of the electrical appliance.

Step 206: Generate the identifying signal according to the type of the electrical appliance.

Figure 4:
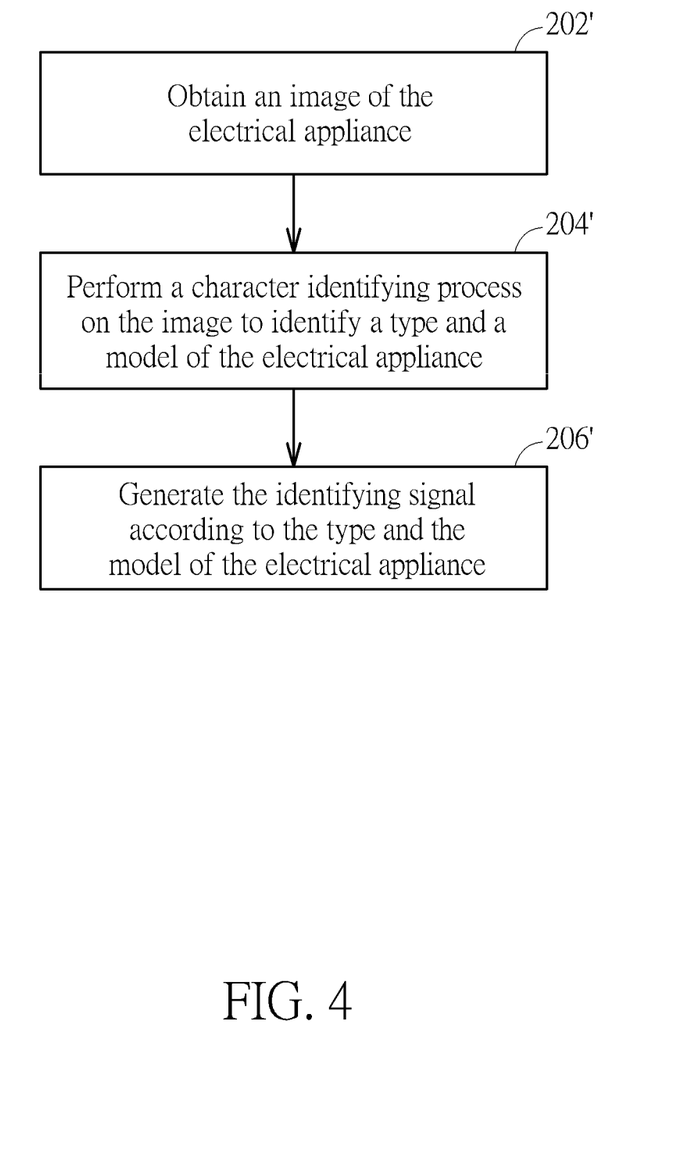
FIG. 4 is a flowchart in accordance with another embodiment of the Step 200 in FIG. 2.

Please refer to FIG. 4. FIG. 4 is a flowchart in accordance with another embodiment of the Step 200 in FIG. 2. The step 200 of identifying the electrical appliance to generate the identifying signal may comprise the following steps:

Step 202': Obtain an image of the electrical appliance.

Step 204': Perform a character identifying process on the image to identify a type and a model of the electrical appliance.

Step 206': Generate the identifying signal according to the type and the model of the electrical appliance.

Figure 5:
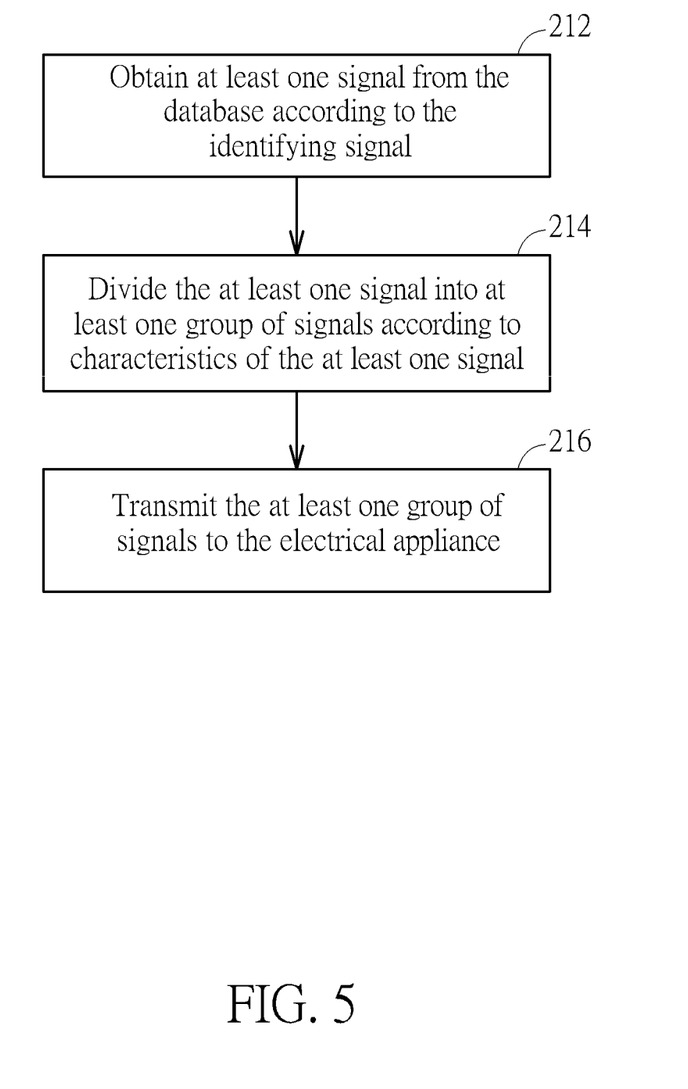
FIG. 5 is a flowchart in accordance with an embodiment of the Step 210 in FIG. 2.

Please refer to FIG. 5. FIG. 5 is a flowchart in accordance with an embodiment of the Step 210 in FIG. 2. The step 210 of obtaining the at least one group of signals from the database according to the identifying signal and transmitting the at least one group of signals to the electrical appliance may comprise the following steps:

Step 212: Obtain at least one signal from the database according to the identifying signal.

Step 214: Divide the at least one signal into at least one group of signals according to characteristics of the at least one signal.

Step 216: Transmit the at least one group of signals to the electrical appliance.

Figure 6:
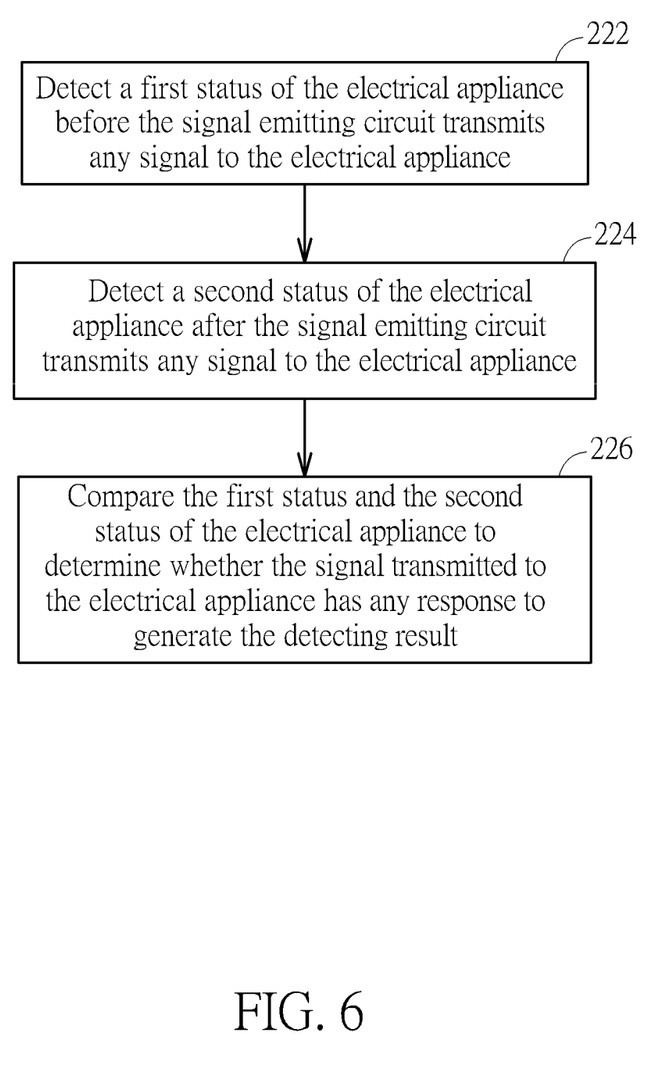
FIG. 6 is a flowchart in accordance with an embodiment of the Step 220 in FIG. 2.

Please refer to FIG. 6. FIG. 6 is a flowchart in accordance with an embodiment of the Step 220 in FIG. 2. The step 220 of detecting whether the signal transmitted to the electrical appliance has any response and generating the detecting result accordingly may comprise the following steps:

Step 222: Detect a first status of the electrical appliance before the signal emitting circuit transmits any signal to the electrical appliance.

Step 224: Detect a second status of the electrical appliance after the signal emitting circuit transmits any signal to the electrical appliance.

Step 226: Compare the first status and the second status of the electrical appliance to determine whether the signal transmitted to the electrical appliance has any response to generate the detecting result.

Figure 7:
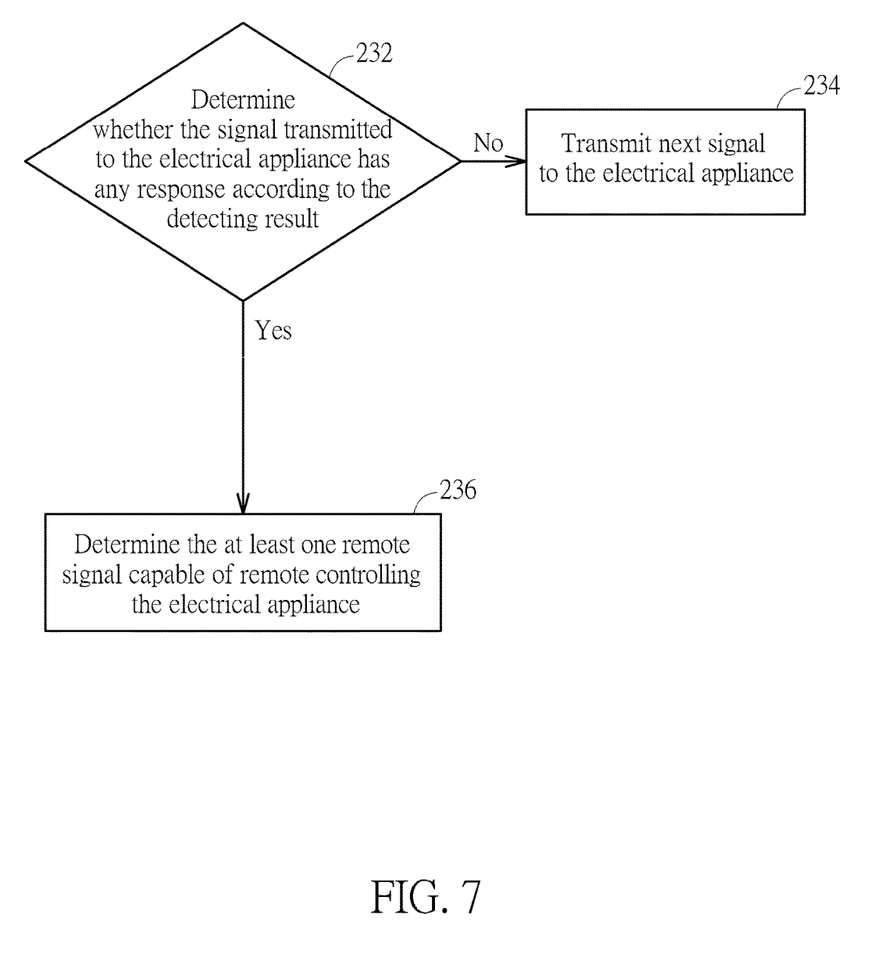
FIG. 7 is a flowchart in accordance with an embodiment of the Step 230 in FIG. 2.

Please refer to FIG. 7. FIG. 7 is a flowchart in accordance with an embodiment of the Step 230 in FIG. 2. The step 230 of determining the at least one remote control signal capable of remote controlling the electrical appliance according to the detecting result may comprise the following steps:

Step 232: Determine whether the signal transmitted to the electrical appliance has any response according to the detecting result. When the detecting result shows that the signal transmitted to the electrical appliance does not have any response, go back to the Step 210 to switch to transmit a next signal to the electrical appliance; and when the detecting result shows that the signal transmitted to the electrical appliance has a response, go to the Step 234.

Step 236: Determine the at least one remote signal capable of remote controlling the electrical appliance.

Briefly summarized, compared to the prior art, the electronic apparatus and methods for automatically matching remote control signal(s) disclosed by the present invention may automatically match the remote control signals for various types or models of the electrical appliances, and thus the electronic apparatus and the methods disclosed by the present invention have advantages of higher automation level, easier operation for users, faster matching speed, and/or saving time by replacing user's complex operation process.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic apparatus, comprising:
    an identifying circuit, for identifying an electrical appliance to generate an identifying signal;
    a signal emitting circuit, coupled to the identifying circuit, for obtaining at least one signal from a database according to the identifying signal, and transmitting the at least signal to the electrical appliance;
    a feedback signal detecting circuit, coupled to the signal emitting circuit, for detecting whether the signal transmitted to the electrical appliance has any response, and generating a detecting result accordingly; and
    a determining circuit, coupled to the feedback signal detecting circuit, for determining at least one remote control signal according to the detecting result, wherein the at least one remote control signal is to control the electrical appliance;
    wherein the electronic apparatus further comprises or is coupled to a camera, and the feedback signal detecting circuit utilizes the camera to capture a first image of the electrical appliance before the signal emitting circuit transmits any signal to the electrical appliance, and the feedback signal detecting circuit utilizes the camera to capture a second image of the electrical appliance after the signal emitting circuit transmits any signal to the electrical appliance, and the feedback signal detecting circuit compares the first image and the second image of the electrical appliance to determine whether the signal transmitted to the electrical appliance has any response.

2. The electronic apparatus of claim 1, wherein the determining circuit is coupled to the identifying circuit, and the determining circuit determines a matching condition according to the identifying signal, and determines the at least one remote control signal according to the detecting result and the matching condition.

3. The electronic apparatus of claim 1, wherein the identifying circuit obtains an image of the electrical appliance, and performs an image identifying process on the image to identify a type of the electrical appliance, and generates the identifying signal according to the type of the electrical appliance.

4. The electronic apparatus of claim 1, wherein the signal emitting circuit divides the at least one signal into at least one group of signals according to characteristics of the at least one signal, and transmits the at least one group of signals to the electrical appliance.

5. The electronic apparatus of claim 1, wherein the feedback signal detecting circuit detects a first status of the electrical appliance before the signal emitting circuit transmits any signal to the electrical appliance, and detects a second status of the electrical appliance after the signal emitting circuit transmits any signal to the electrical appliance, and compares the first status and the second status of the electrical appliance to determine whether the signal transmitted to the electrical appliance has any response.

6. The electronic apparatus of claim 5, wherein the feedback signal detecting circuit comprises a sensor, and the feedback signal detecting circuit detects the status of the electrical appliance via detecting a status of the sensor.

7. A method for automatically matching remote control signal, comprising:
   identifying an electrical appliance to generate an identifying signal;
   obtaining at least one signal from a database according to the identifying signal, and transmitting the at least one signal to the electrical appliance;
   detecting whether the signal transmitted to the electrical appliance has any response, and generating a detecting result accordingly; and
   determining at least one remote control signal according to the detecting result, wherein the at least one remote control signal is to control the electrical appliance;
   wherein the step of detecting whether the signal transmitted to the electrical appliance has any response, and generating the detecting result accordingly comprises:
      capturing a first image of the electrical appliance before transmitting any signal to the electrical appliance;
      capturing a second image of the electrical appliance after transmitting any signal to the electrical appliance; and
      comparing the first image and the second image of the electrical appliance to determine whether the signal transmitted to the electrical appliance has any response.

8. The method of claim 7, further comprising:
   determining a matching condition according to the identifying signal, and determining the at least one remote control signal according to the detecting result and the matching condition.

9. The method of claim 7, wherein the step of identifying the electrical appliance to generate the identifying signal comprises:
   obtaining an image of the electrical appliance;
   performing an image identifying process on the image to identify a type of the electrical appliance; and
   generating the identifying signal according to the type of the electrical appliance.

10. The method of claim 9, wherein the step of detecting whether the signal transmitted to the electrical appliance has any response, and generating the detecting result accordingly comprises:
    detecting a first status of the electrical appliance before transmitting any signal to the electrical appliance;
    detecting a second status of the electrical appliance after transmitting any signal to the electrical appliance; and
    comparing the first status and the second status of the electrical appliance to determine whether the signal transmitted to the electrical appliance has any response.

11. The method of claim 10, wherein the step of detecting the status of the electrical appliance is performed via detecting a status of a sensor.

12. The method of claim 7, wherein the step of obtaining the at least one signal from the database according to the identifying signal, and transmitting the at least one signal to the electrical appliance comprises:
    dividing the at least one signal into at least one group of signals according to characteristics of the at least one signal; and
    transmitting the at least one group of signals to the electrical appliance.

* * * * *